Patented Oct. 19, 1954

2,692,262

UNITED STATES PATENT OFFICE 2,692,262

SULFURIZED LEUCO-INDOPHENOL DYE-STUFFS AND PROCESS FOR THEIR PRODUCTION

Hans Bosshard, Basel, Switzerland, assignor to J. R. Geigy A. G., Basel, Switzerland, a Swiss firm No Drawing. Application March 11, 1952, Serial No. 276,057

Claims priority, application Switzerland March 22, 1951

7 Claims. (Cl. 260—134)

The present invention concerns the production of blue sulphur dyestuffs which are distinguished by their purity of shade, very good fastness to light and good fastness to chlorine.

Technically, the sulphur dyestuffs are a very important group of synthetic dyestuffs. In spite of their relative cheapness, generally their cellulose dyeings have excellent wet fastness properties and a quite good fastness to light. A great disadvantage of most sulphur dyestuffs however, is their very slight fastness to chlorine. Hydron Blue R, (Schultz Dyestuff Tables 7th Edition, No. 1111; Colour Index 1st Edition No. 969) which is produced by sulphurising the indophenol obtained from carbazole and p-nitrosophenol, is an extraordinary exception, but even so this otherwise very valuable dyestuff has a rather dull shade and in practice can only be dyed from a sodium hydrosulphite vat because even duller shades are obtained from an alkali-sulphide vat.

It has now been found that very pure, fast to light and wetness, blue sulphur dyestuffs with a similarly good fastness to chlorine can be produced from starting materials which are technically easily available by reacting indophenols of the general formula:

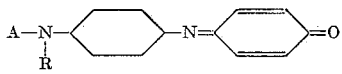

or their leuco compounds with agents introducing sulphur. In this formula R represents a low molecular aliphatic hydrocarbon radical and A represents an aromatic radical of the benzene series.

The indophenols usable according to this invention are obtained easily by methods known per se. For example N-alkyl diphenylamines and their derivatives, if desired substituted in the benzene ring A, can be condensed in strong aqueous mineral acid in the cold with p-nitrosophenol or its derivatives halogen substituted in the benzene ring. Methyl groups and halogen atoms are advantageous as substituents in the benzene ring A of the indophenols usable according to the present invention, the methyl group is most advantageous as aliphatic substituent R at the nitrogen atom because of its easy accessibility, particularly good fastness to chlorine and the favourable drawing power of the dyestuffs. The fastness to chlorine decreases as the number of carbon atoms of the radical R increases.

Sulphurisation is performed advantageously by reacting alkali polysulphides in the form of their concentrated aqueous solutions with the leuco compounds of the indophenols usable according to this invention, preferably in the presence of organic solvents at a raised temperature. For example, sodium polysulphides with 4 to 6 sulphur atoms can be used as alkali polysulphides of the formula $Me_2S_x$. However, the use of sodium polysulphide solutions which still contain free sulphur so that the total sulphur content corresponds to 6 to 8 for the index $x$ in the above formula are to be preferred. The sulphurising temperature can vary very greatly; for example the dyestuff formation may occur at 80° and also at over 200°. The choice of a sulphurising temperature of 100 to 130° and a reaction time of 24–72 hours is advantageous. Of the organic solvents, the high boiling alcohols and, of these, the glycol monoalkyl ethers have proved to be very suitable, e. g. the glycol monomethyl and glycol monoethyl ethers. The sulphur dyestuffs according to this invention can be isolated after removal of the organic solvent for example by steam distillation, by acidification of the vat with mineral acids in the usual way or by aeration. The dyestuffs according to this invention are then obtained in the form of deep blue powders with a bronze shimmer. Both from a sodium sulphite and a sodium hydrosulphite vat, the vats, if desired, containing salts such as sodium chloride or sodium sulphate, they dye cellulose fibres in very beautiful reddish to greenish blue shades after the usual hanging in the air. The dyeings have very good fastness to light, wetness and chlorine.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

100 parts of a dry leuco indophenol of the following constitution:

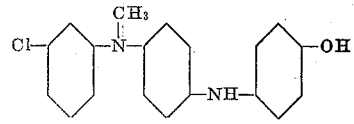

are added to a polysulphide solution produced by melting 156 parts of sulphur and 107 parts of 60% technical sodium sulphide with 400 parts of ethylene glycol monomethyl ether. The sulphurising melt so obtained is boiled under reflux at 110° for 48 hours. After removal of the solvent by steam distillation, the dyestuff can be precipitated by aeration. When dry, the dyestuff is a dark red bronze-shimmering powder which dissolves in concentrated sulphuric acid with a clear blue colour. It dyes cotton a clear reddish-blue shade from a liquor containing sodium sulphide. Apart from good general fastness properties in particular the dyeings have, for sulphur dyestuffs, an excellent fastness to chlorine. Also the corresponding amount of the p-chloro compound can be used instead of the m-chloro compound. A dyestuff with similar properties but of a greener shade is obtained.

*Example 2*

110 parts of the leuco compound of the formula:

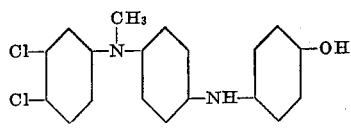

are melted and further worked up as described in Example 1. A dyestuff is obtained which when dyed according to the method described in Example 5 or 6 gives very reddish-blue dyeings which are fast to chlorine.

*Example 3*

250 parts of a dry leuco indophenol of the following constitution:

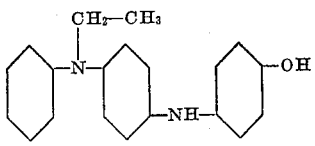

are added to a polysulphide melt consisting of 336 parts of sulphur, 273 parts of sodium sulphide (60%) and 750 parts of ethylene glycol monoethyl ether, and the mixture is brought to the boil. The boiling point of the melt is brought to 115° by the addition of water and the whole is boiled under reflux at this temperature for 40 hours. The water is then removed by steam distillation and, after adding about 100 parts of 100% sodium sulphide to the dirty yellow-green dyestuff solution, it is filtered. The dyestuff can be isolated in the usual way either by acidification or aeration. After drying, the dyestuff is a dark blue powder with a red-bronze shimmer which dyes vegetable fibres in pure greenish-blue shades from a bath containing sodium sulphide. It has excellent fastness properties and the fastness to chlorine attains a degree which has never been achieved up to now by blue sulphur dyestuffs.

A dyestuff with somewhat less fastness to chlorine is obtained by the same process if in the above example 273 parts of the leuco indophenol of the formula:

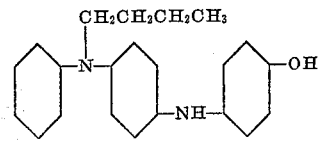

are used.

A very similar dyestuff with somewhat better fastness to chlorine is obtained by the same process if instead of the leuco indophenol used above, 280 parts of a dry leuco compound of the formula:

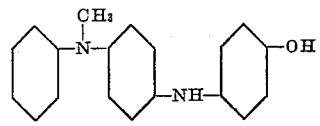

are used.

*Example 4*

94 parts of the leuco indophenol of the formula:

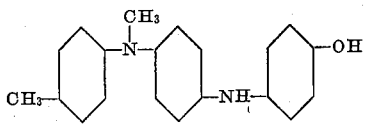

are melted and worked up as described in Example 1. A dyestuff is obtained which dyes cellulose fibres in a strong pure greenish-blue shade from a bath containing sodium sulphide. It has valuable fastness properties and in particular, good fastness to chlorine.

The corresponding amount of the m-methyl compound can be used instead of the p-methyl compound. A dyeing with very similar fastness properties is obtained from a bath containing caustic soda lye-hydrosulphite.

*Example 5*

90 parts of water, 12 parts of crystalline sodium sulphide and 6 parts of soda ash are added to 3 parts of the dyestuff obtained according to Example 1 and the whole is heated until a complete solution is obtained when a dirty yellow-green vat is formed. 3,900 parts of hot water are added to this stock vat. 100 parts of cellulose material are treated in this dyebath for 45 minutes at the boil. To improve the drawing power, 10-60 parts of Glaubers or common salt may be added. The dyed goods are wrung out and oxidised for 15 minutes in the air whereupon a reddish-blue shade develops. After rinsing well and drying, a very pure reddish-blue dyeing is obtained which is distinguished by good fastness to chlorine and good general fastness properties.

The dyestuffs obtained according to Examples 2, 3 and 4 can be dyed in an analogous manner.

*Example 6*

10 parts of alcohol or a wetting agent, e. g. Turkey red oil, and 150 parts of water at 80° are added to 3 parts of the dyestuff obtained according to Example 3. A clear pale yellow stock vat is obtained by the addition of 7.5 parts of caustic soda lye (36° Bé.) and 6 parts of hydrosulphite conc. The stock vat is added to 2,800 parts of a dyebath which contains 6 ml. of caustic soda lye (360 Bé.) and 4 g. of hydrosulphite per g. litre. Vegetable fibres are dyed for 45 minutes at 60°. After wringing out, hanging and rinsing, a pure greenish-blue dyeing is obtained which is similar to that of the sodium sulphide dyeing and which has the same excellent fastness properties.

Soda may be used instead of caustic soda lye both for the formation of the stock vat and the dye bath.

Glaubers or common salt may be added to the baths in the usual way to improve the drawing power.

The dyestuffs obtained according to Examples 1, 2 and 4 can be dyed in an analogous manner.

What I claim is:

1. A blue sulphur dyestuff obtained by reacting at 100-140° C. with an alkali polysulphide of formula $Me_2S_x$, wherein Me stands for the alkali metal and the numerical relationship of $Me_2S$ to S ranges from 1:3 to 1:7, in the presence of an organic solvent the leuco compound of indophenol coresponding to the formula:

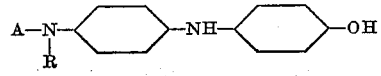

wherein A represents a phenyl radical and R represents lower alkyl.

2. A blue sulphur dyestuff obtained by reacting at 100–140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

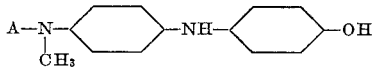

wherein A represents a phenyl radical.

3. A blue sulphur dyestuff obtained by reacting at 100–140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

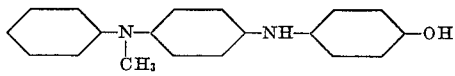

4. A blue sulphur dyestuff obtained by reacting at 100 to 140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

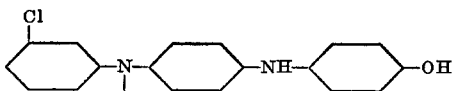

5. A blue sulpur dyestuff obtained by reacting at 100 to 140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

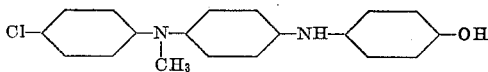

6. A blue sulphur dyestuff obtained by reacting at 100 to 140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

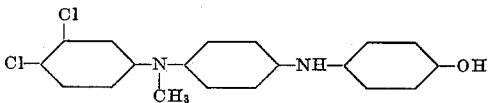

7. A blue sulphur dyestuff obtained by reacting at 100 to 140° C. with an alkali polysulphide of formula Me₂Sₓ, wherein Me stands for the alkali metal and the numerical relationship of Me₂S to S ranges from 1:3 to 1:7, in the presence of an organic solvent the leuco compound of an indophenol corresponding to the formula:

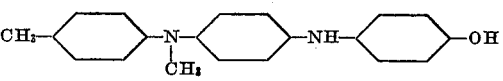

References Cited in the file of this patent

UNITED STATES PATENTS

| Number | Name | Date |
|---|---|---|
| 1,449,681 | Kramer et al. | Mar. 27, 1923 |
| 2,083,891 | Zerweck et al. | June 15, 1937 |